INVENTORS
Lars O. Prestrud
Francis P. Murphy
BY
ATTORNEYS

Aug. 26, 1958  L. O. PRESTRUD ET AL  2,848,977
PORTABLE CATTLE DIP
Filed July 13, 1956  3 Sheets-Sheet 2

INVENTORS
Lars O. Prestrud
Francis P. Murphy
BY

ATTORNEYS

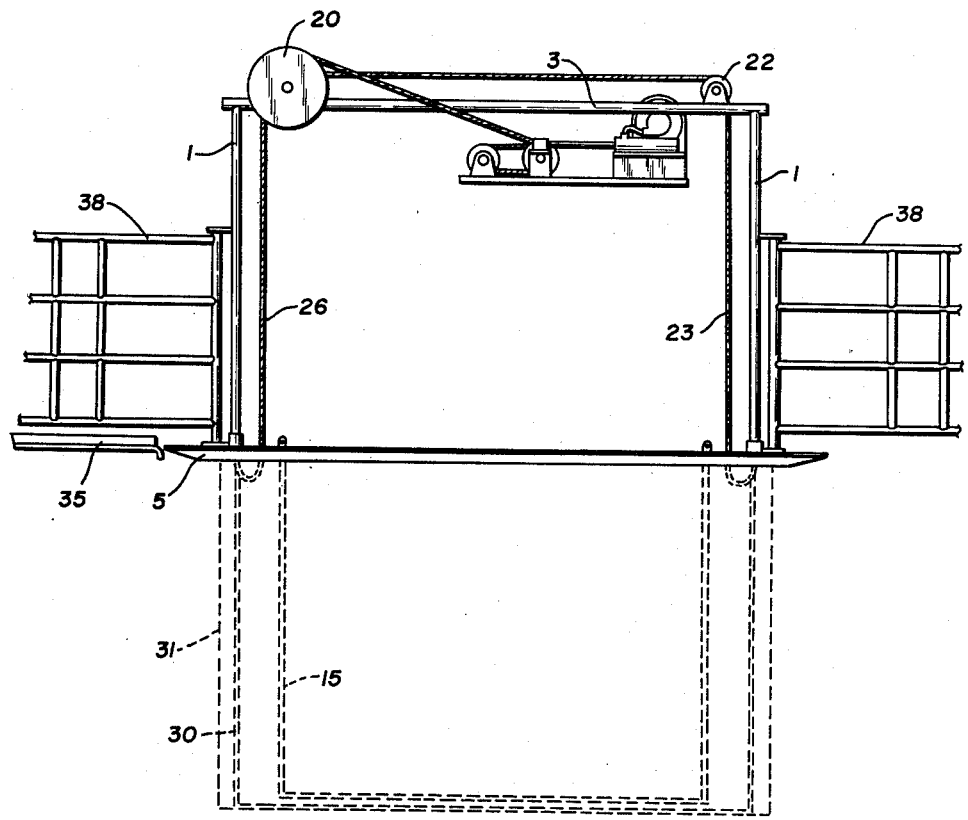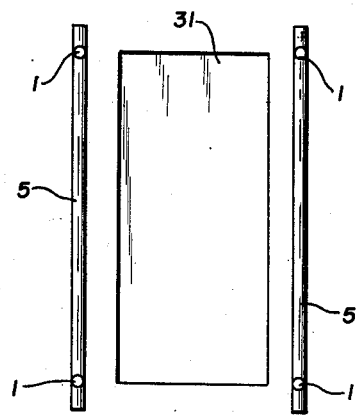

United States Patent Office 2,848,977
Patented Aug. 26, 1958

2,848,977

PORTABLE CATTLE DIP

Lars O. Prestrud, Denver, and Francis P. Murphy, Coalmont, Colo.

Application July 13, 1956, Serial No. 597,632

1 Claim. (Cl. 119—158)

This invention relates to portable dipping tanks for domestic animals, particularly for dipping cattle in an insecticide solution for the eradication of various pests and diseases to which such livestock is subjected. In cattle raising areas the distances from grazing lands to the base of operations are normally great enough to make it detrimental to follow the usual practice of having the dipping tanks at the base of operations and periodically driving the livestock from the grazing lands to the point of operation. In one very common practice an elongated tank is provided through which the livestock are driven, and the tanks are usually deep enough to make the animals swim through the insecticide solution. This procedure is not always completely effective since the animals may not be completely submerged in the insecticide solution.

According to the present invention there is provided a portable dipping tank for cattle which provides complete immersion of livestock in an insecticide solution. The invention also provides a dripping chute in which a dipped animal is allowed to remain to permit the insecticide dripping from the animal to drain back into the tank and thereby prevent the loss of the solution. The apparatus is constructed to permit the dipping of individual animals completely with sufficient accuracy and submergence to effectively control the pests and diseases which are being treated, and prevent further spread of disease of improperly treated animals. The device also includes a lowering stage which lowers the animal into an insecticide vat, and the lowering mechanism of which may be utilized for raising and lowering the tank itself for portability.

Included among the objects and advantages of the present invention is the provision of a portable animal dipping vat which provides an effective dipping means for cattle and other animals at their particular grazing range. The device utilizes an animal lowering and raising stage for completely submerging the animal in an insecticide solution, and the raising and lowering mechanism may be utilized for raising and lowering the insecticide tank for portability of the device. The device is of sturdy construction to withstand the heavy weights to which it must be subjected in the dipping of cattle and such heavy animals and still be sufficiently light for portability.

These and other objects and advantages of the invention may be readily ascertained by referring to the following description and illustrations in which:

Fig. 4 is a schematic side detail of the tank section and lifting mechanism according to the invention; and Fig. 5 is a schematic view of the support for the dipping device in relation to an insecticide tank into which the animals are immersed.

Figure 1:
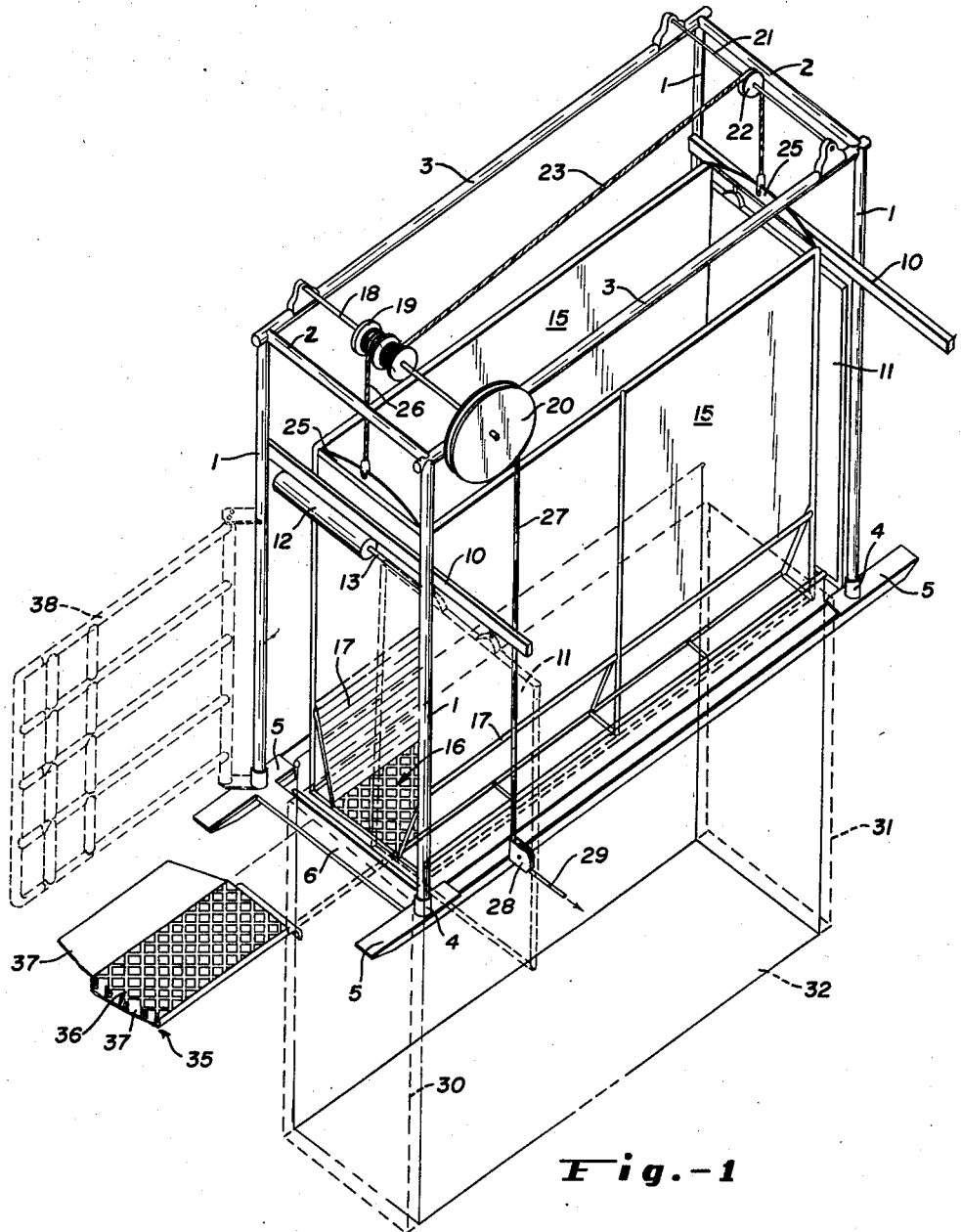
Fig. 1 is a perspective view of a dipping device according to the invention.

In the device selected for illustration in Fig. 1, a superstructure which consists of uprights 1 mounted at substantially the four corners of the superstructure are interconnected with end horizontals 2 and side horizontals 3 forming a substantially open frame structure. The bottoms of the uprights 1 are mounted in sleeves 4 which are integrally mounted on two skids 5. The skids are interconnected together by lateral members 6 so that the whole superstructure is substantially rigid. A door slide 10 is mounted laterally across each end of the uprights 1 as by welding, nuts and bolts, etc., and a door or gate 11 is slidably mounted on the slide 10. The gate slide mount 10 extends beyond one of the uprights 1 so that the gate may be slid away from the opening between the two end uprights. A hydraulic cylinder 12 is connected by means of its plunger rod 13 to the door for operating the gate.

A stage, shown generally by numeral 14, having side walls 15 and a perforated bottom 16 is arranged to be mounted internally of the superstructure. A pair of short kick walls 17 reduce the area of the perforate floor 16 of the stage and aid in the control of an animal mounted in the stage. A shaft 18 journalled for rotation at one end of the superstructure has a cable drum 19 mounted substantially centerwise thereof and a drum pulley 20 mounted at one end thereof. At the opposite end of the superstructure a shaft 21 is journalled for rotation and a pulley 22 is mounted substantially centerwise thereof. A rope 23 which passes over the pulley 22 is interconnected with a cross member 25 of the stage and a cable 26 is interconnected with a similar cross member 25 at the opposite end of the stage. The cables 23 and 26 wind and unwind on the drum 19 as it is rotated one way or the other. A cable 27 is mounted on the pulley drum 20. The cable 27 passes through a lower pulley 28 and extends outwardly at 29 toward a drive mechanism. The cables are so wound on the drums 19 and 20 that by pulling on the end 29 of the rope 27 the stage is raised, and by releasing the end of the cable 29 the stage is lowered. The end of the cable 29 may be attached to a prime mover, such as a truck, tractor, team of horses, et cetera, which moves toward and away from the dipping vat for raising and lowering the stage, or it may be interconnected with a cable drum which is rotated by any convenient stationary prime mover.

A tank 30 is arranged to be mounted in a hole 31 in the ground, so that the tank bottom 32 rests on the bottom of the hole when in operative position. The hole is made only wide enough to fit inside the two slides 5 and within the lateral braces 6. The tank is arranged to hold a solution of insecticide and the cage may be lowered into the solution for animal dipping operations.

A drain rack, shown in general by numeral 35, includes an imperforate shallow flume 36 having side flanges 37 which is arranged to be contiguous with and slopes toward the tank so that solution which drips onto the flume drains back into the tank 30. A perforated walkway 36a is mounted in the flume 36 so that liquid from the dripping animal can drip into the flume and the animal will not be walking on the bottom of the flume which is normally slippery. A pair of side gates 38, shown in dashed lines and only one of which is shown, may be interconnected with the uprights and extend along the course of the flume 36 to keep the animal on the drain back tray. At the outer end of the side gates away from the dip tank is a retaining gate (not shown) so as to hold the animal on the drain rack for sufficient time to permit the insecticide to drain back into the tank. The drain rack may be made long enough to hold several animals to provide speed of operation and sufficient retention time for recovery of liquid from the animals.

In operating the device of the invention, the entire dipping mechanism is pulled to the point of use in a grazing or other area and a hole about three and a half feet wide and eight feet long dug in the ground to a depth of about six feet deep. The dipping mechanism is then placed over the hole so that skids 5 are spaced on each side of the hole. The cables 23 and 26 which are interconnected with the tank 30 are then lowered so that the tank 30 is lowered into the hole. The cage or stage 14 is normally resting in the tank and by transferring the connection of the ropes to the crossbars 25 of the cage from the tank, the cage may be raised and lowered into the tank. The tank is filled with an insecticide solution suitable for the dipping. The gates or chutes 38 are lined up with the ends of ths stage, and the drain rack 35 is placed in position at the discharge end of the device. Cattle or other animals are then driven into the chute and by opening the inlet gate 11 one animal at a time is driven onto the stage and the gate is closed.

The raising and lowering mechanism is operated to release the cage so that it descends into the insecticide solution and the animal is thereby immersed. After a sufficient time the stage is then raised, the front gate 11 is opened and the animal permitted to move onto the drain rack 35. The front gate 11 is then closed and the rear gate opened and another animal is then driven onto the stage. The first animal is held on the drip rack drain tray 35 while the dipping procedure of the next animal occurs so that the dripping insecticide will flow back into the tank.

Where a stationary drive motor and a cable drum is interconnected with the cable end 29 a single operator standing at about the front door 11 may operate the mechanism by having remote controls for the gate opening cylinders 12 which operate the gates 11. If proper electric current or hydraulic fluid under pressure is not available, handles may be placed on the gates and the mechanism operated manually. In this instance a truck or tractor is normally interconnected with the end of the cable 29 and the vehicle is moved toward and away from the dipping vat for raising and lowering the cage.

Figure 2:
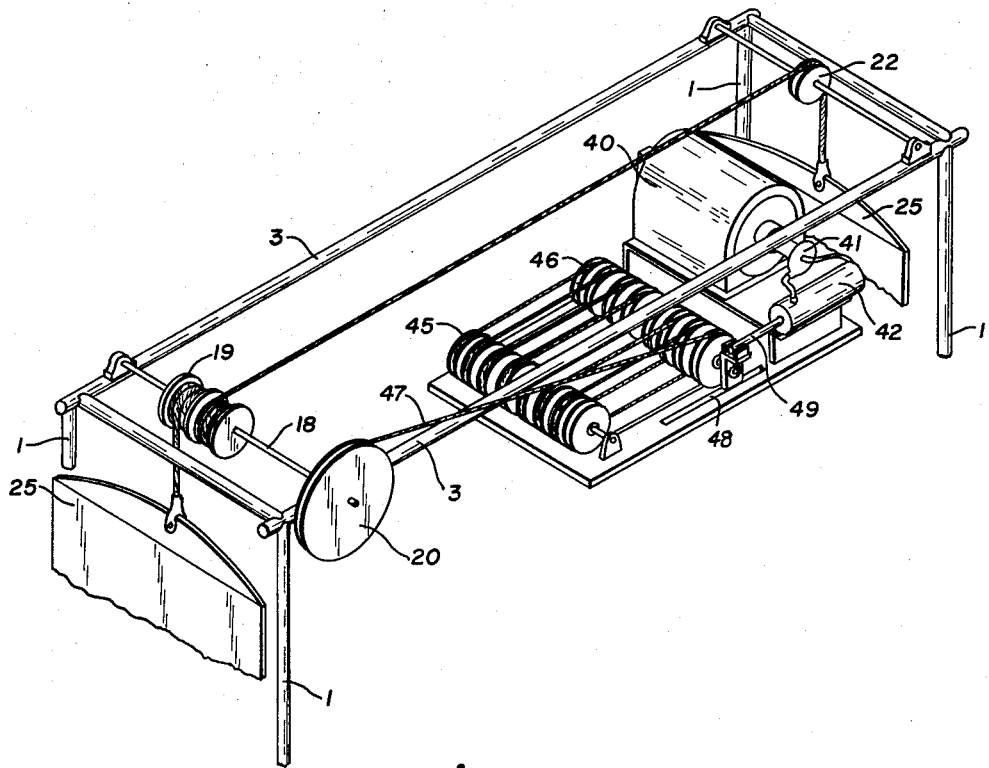
Fig. 2 is an enlarged perspective detail of a lifting mechanism according to the invention.
Figure 3:
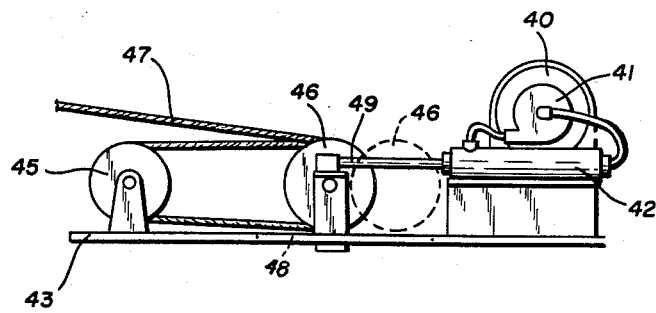
Fig. 3 is a side elevation of the lifting mechanism illustrated in Fig. 2.

In modification illustrated in Figs. 2 and 3, an electric motor 40 is utilized to drive a hydraulic pump 41 which is interconnected with a cylinder 42. The motor pump and the cylinder are all mounted on a frame 43 which also supports a stationary plural sheave arrangement 45 at one end and a movable plural sheave arrangement 46 intermediate thereof. A cable 47 is interlaced between the two sets of plural sheaves, and one end of the cable is fastened adjacent the stationary sheave. The movable set of sheaves 46 moves along a slot 48 in the frame so as to move toward and away from the sheave 45. The oposite end of the cable 47 is secured to the drum pulley 20 which rotates the shaft 18. The number of loops between the immovable sheave set and the movable sheave set determines the actual take-up on cable 47 when the movable sheave set is moved along the slot. By operating the hydraulic cylinder 42 to retract the plunger 49, the movable sheave set 46 moves away from the stationary sheave set 45 and each of the loops of cable between the two sheave sets is thereby lengthened.

For example, if eleven loops are interlaced between the two sheave sets, movement of the hydraulic cylinder one inch will take up the cable 47 eleven inches. In a like vein, releasing the hydraulic cylinder releases the cable an equivalent amount. Where electricity is available, the hydraulic pump may be utilized to supply hydraulic fluid to drive the hydraulic cylinders which operate the gates at both ends of the dipping tank.

In transporting the dipping vat from place to place the stage is normally lowered into the tank and the tank is then raised out of the hole. All the chute sides and gates are stored in the tank and the whole device is either mounted on a truck or a trailer or is dragged to the new location. For long hauls it is preferable to pull the device onto a flat trailer, but for short hauls a truck or a tractor may be used to drag the dipping vat from spot to spot.

While the invention has been illustrated by reference to specific illustrations there is no intent to limit the scope or the spirit of the invention to the precise details so described, except insofar as set forth in the following claim.

We claim:

A portable animal dipping vat of the class described comprising a pair of elongated skids spaced apart in parallel relation in position to straddle a narrow, elongated hole in the earth, an open framework inclusive of four corner posts mounted on said skids and a plurality of cross members interconnecting said corner posts, said framework extending a substantial distance above said skids and having an animal inlet at one end and an outlet at the opposite end, a solution tank mounted between said skids and movable from an upper movable position to an animal dipping position below said skids, an open ended, animal stage insertable in the tank and mounted in said framework and movable from a position in said framework at about skid level to a lower position substantially below said skids, a gate reciprocally mounted at each open end of said framework for opening and closing said open ends, a cable supporting shaft rotatably mounted adjacent each end of the framework and at an elevated position therein, a lift cable interlaced about shafts for conjointly rotating said shafts, there being two free cable ends extending downwardly from and operable for raising and lowering by said shafts, connection means on each of the free ends of said cable for selectively interconnection with said tank for movability and said stage for animal dipping, and means for rotating at least one said shaft for raising and lowering the free ends of said cable.

References Cited in the file of this patent

UNITED STATES PATENTS

| | | |
|---|---|---|
| 663,417 | Clayton | Dec. 11, 1900 |
| 780,011 | Newberry | Jan. 10, 1905 |
| 1,188,760 | Hagenbucher | June 27, 1916 |
| 2,500,879 | Smallpeice | Mar. 14, 1950 |

FOREIGN PATENTS

| | | |
|---|---|---|
| 158,983 | Australia | Sept. 22, 1954 |